Nov. 8, 1960  G. DE VARDA  2,959,533
PRODUCTION OF ALUMINIUM BY FUSED SALT ELECTROLYSIS
WITH VERTICAL OR INCLINED CATHODES
OF CARBON AND ALUMINIUM
Filed July 25, 1956  3 Sheets-Sheet 1

INVENTOR
GIUSIPPE DE VARDA

BY

ATTORNEY

Nov. 8, 1960  G. DE VARDA  2,959,533
PRODUCTION OF ALUMINIUM BY FUSED SALT ELECTROLYSIS
WITH VERTICAL OR INCLINED CATHODES
OF CARBON AND ALUMINIUM
Filed July 25, 1956  3 Sheets-Sheet 2

INVENTOR.

Giuseppe de Varda

Nov. 8, 1960 G. DE VARDA 2,959,533
PRODUCTION OF ALUMINIUM BY FUSED SALT ELECTROLYSIS
WITH VERTICAL OR INCLINED CATHODES
OF CARBON AND ALUMINIUM
Filed July 25, 1956 3 Sheets-Sheet 3

Sezione A-A

Sezione B-B

INVENTOR.

Giuseppe de Varda

United States Patent Office 2,959,533
Patented Nov. 8, 1960

2,959,533

PRODUCTION OF ALUMINIUM BY FUSED SALT ELECTROLYSIS WITH VERTICAL OR INCLINED CATHODES OF CARBON AND ALUMINIUM

Giuseppe de Varda, Milan, Italy, assignor to Montecatini-Societa Generale per l'Industria Mineraria e Chimica, a corporation of Italy Filed July 25, 1956, Ser. No. 600,055

Claims priority, application Italy July 28, 1955

19 Claims. (Cl. 204—244)

The present invention relates to the production of aluminium by means of fused salt electrolysis, from alumina dissolved in a bath of fused salts. In particular, the invention is directed to improvements relative to the methods of aluminum production and furnaces disclosed in applicant's copending U.S. patent applications, Serial No. 480,509, filed January 7, 1955, entitled "Furnace and Process for the Electrolysis of Aluminum"; Serial No. 551,679, filed December 7, 1955, entitled "Process for the Production of Aluminum by Fused Bath Alumina Electrolysis and Three-Layer Anode for Carrying out said Process"; and Serial No. 587,985, filed May 29, 1956, entitled "Multicell Closed Circuit Furnace and Fused Salt Electrolysis Process for Aluminium Production from Aluminium Oxide."

Objects of the present invention are to increase ampere-efficiency, preferably beyond 85-90%, and to lower the cathodic voltage drop, consequently reducing unit consumption of energy and the over-all voltage of the cell, respectively. Particularly in multi-cell furnaces with stationary anodes, unit energy consumption in furnaces according to the present invention can be reduced to values never attained heretofore.

It is another object of the present invention to improve the operational (e.g. electrical, electrochemical and chemical) characteristics of the cathode; in particular, to obtain a more effective cathode which is active in its depth as well as at its surface, and also to protect the cathode carbon in order to improve its durability.

In the present specification and in the appended claims, the term "carbon" as applied to the electrodes is to be understood to mean any carbonaceous materials, compositions or agglomerates as used or known in the art for electrodes with fused bath electrolysis, so-called electrodic carbon, including the so-called amorphous carbon, pre-baked as well as self-baking electrode pastes, and also graphite; it being understood that the anodes are preferably of amorphous baked carbon paste while the cathode carbon will preferably be graphite.

In the cells with stationary electrodes of the furnaces described in applicant's above mentioned patent applications, the cathode is constituted by an inclined plane surface of electrode carbon or graphite, whereon the aluminum flows down by gravity in the form of drops or a film, collecting in a lower chamber made of electrically insulating material. However, the aluminium at the bottom of the cell is in electrical contact with the carbon cathode above.

On the contrary, in electrolysis furnaces for the production of aluminium heretofore used, having pre-baked anodes or self-baking anodes of the various kinds (having metallic vertical nipples or sub-horizontal nipples) the cathode is constituted, as is well-known, by a horizontal layer of molten aluminium that covers the bottom of the furnace cavity, the furnace box or shell being lined with a suitable carbonaceous conglomerate. However, the vertical internal walls or the sub-vertical internal walls made substantially of the carbonaceous conglomerate, and in electrical contact with the bottom of the bin, may also act as cathodes. Hence electrolytic separation of a certain quantity of cations (aluminium or sodium) may also take place on these walls. The quantity of metal that separates at the side walls is a function of various factors, and may correspond to a substantial fraction of the total current. Among these factors, particularly important are the current intensity, the ratio of the distances between the anode and the aluminium cathode, and between the anode and the vertical carbon cathode, the ratio between the electrodically active vertical and horizontal surface areas, the composition, the temperatures and the heat gradient of the molten bath, and the dimensions and the condition of preservation of the cathode carbon walls.

Usually in commercial electrolysis furnaces for aluminium production, the distance between the lower base of the adjustable carbon electrode (anode) and the underlying submerged layer of molten aluminium is of the order of magnitude of some centimetres, while the distance between the anode carbon and the corresponding wall of cathode carbon is of the order of magnitude of some decimetres.

Also the current density in the interspace formed by the carbon anode submerged in the molten bath and by the corresponding wall of cathodic carbon is usually a small fraction of the current density in the interspace that forms in the horizontal interelectrodic layer separating the submerged base of the anode from the underlying layer of molten aluminium covering the bottom of the cell.

However, the current directly deviated from the anode to the cathodic carbon walls may, in conventional furnaces as heretofore used (that is, the types having horizontal layers), attain percentages of the total current which are not negligible.

It is well known that the walls of cathodic carbon have shorter life than the horizontal bottom lining. After a certain number of months of operation (depending on the constructional and operational characteristics of the furnace), the carbon walls are gradually replaced automatically by borders constituted essentially of solidified bath components; this process of spoiling and replacing being probably due to chemical, electro-chemical, mechanical and thermal causes.

For the attainment of the aforesaid objects and advantages, and avoidance of the disadvantages referred to, the present invention provides a furnace for the production of aluminium by fused salt electrolysis, with at least one electrolysis cell having a vertical or inclined wall of cathode carbon, characterized in that the surface of said wall is formed with cavities adapted to serve as receptacles for retaining molten aluminium so as to form at the cathode surface stabilized active and protective centres, that is, to create, on vertical or inclined cathode walls, cathodic surface areas of aluminium distributed in a suitable manner at various heights and practically stable in operation.

In a furnace in accordance with the present invention, the superficial layer of said wall may be formed by a more or less thin layer of porous or spongy cathode carbon, which should be in good mechanical and electrical contact with the ordinary compact carbon cathode, the pores or cavities in said layer being adapted to be filled with and retain molten aluminium.

Alternatively, and preferably, in the vertical or inclined cathodic wall of a carbon cathode constructed according to the present invention, said cavities may constitute grooves or channels extending horizontally or substantially horizontally, or they may be holes formed in the superficial layer of said wall, in such manner as to form, at a number of locations (even if limited), reservoirs for collection and retention of molten aluminium. This affords, in use, horizontal cathode surfaces dispersed or distributed over the whole active cathode surface.

The surface areas of the aluminium collected in the above-mentioned cathodic cavities, in steady contact with the molten bath, may attain or surpass even 30–50% of the corresponding vertical or inclined anodic surfaces.

Further, according to the invention, the vertical or inclined portions of the surface of the cathodic wall in contact with the bath, other than those adapted to retain molten aluminium, may be coated with material inert to the bath components and to the molten metal so as further to increase the protection of the cathode carbon. Said coating may consist of a thin layer of material which is unattackable and electrically insulating or of slight conductivity such as that employed for the protective coating of the flanks of the electrolysis cells and the lining of the lower chambers for collecting aluminium, according to the above-mentioned patent applications, e.g. electrofused magnesium oxide or aluminium oxide. In that case the necessary aluminium-carbon contact will occur exclusively at the inner walls of the cavities, e.g. of the horizontal, suitably shaped grooves or channels in which the aluminium depositing is retained until it fills them so that they remain permanently full with molten aluminium.

The principle underlying the main characteristic of the invention is indeed to operate the carbon cathode, in the kind of electrolysis to which the invention relates, in the presence of a sufficient quantity or, better stated, a sufficient number of active and protective centers of molten aluminium in contact with the cathode carbon, said aluminium being distributed over the non-horizontal surface of the latter. This preferably is effected not only during normal operation, but also when starting, by introducing or pouring molten aluminium on to said cathode.

Merely by way of indication, said active center or surfaces may be spaced from one another by say, 1 to 20 cm., though it may be advisable to surpass or to remain below these limits.

From the point of view of efficient operation, it is advisable that the cells for electrolysis of alumina, in a bath of fused salts having cathodes of carbon with vertical or inclined walls formed according to the present invention, be supplied with aluminium oxide already previously dissolved in the bath, or, alternatively, with aluminium oxide in powder form in zones distant from said cathode walls, so as to avoid clogging of the receptacles with solid powdery aluminium oxide, which is heavier than molten aluminium.

In the usual furnaces with horizontal layers, the vertical carbon walls forming integral parts of the carbon lining are in electrical contact with the molten aluminium that collects on the conductive bottom of the cell. In the cells of the furnaces according to the above-mentioned copending patent applications the aluminium produced is collected below each cell in a chamber of inert material. Ordinarily the aluminium collected in said lower chamber is in electrical contact with the cathodic carbon and, therefore, at or nearly at the same potential.

To ensure the continuity of such a contact, in cells with inclined electrodes of the kind described in the cited copending patent applications, the cathodic carbon may for example conveniently be extended downwards so that it is submerged in the chamber for collecting the metal, over the whole or part or parts of its width.

The foregoing and other features of the invention will be better understood from the following description presented by way of example and without limitation, with reference to the accompanying diagrammatic drawings, wherein.

Figures 10, 12, 13:
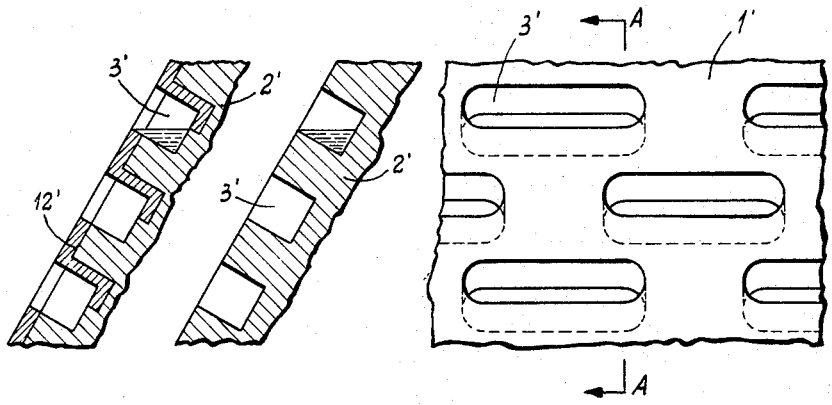
Figures 11, 14, 15:
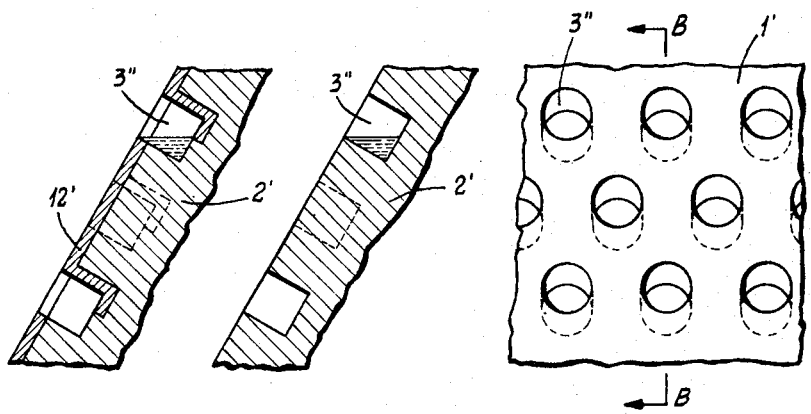

Figs. 10 and 11 show in fragmentary frontal elevation two further embodiments of cathode surfaces according to the invention, and Figs. 12 and 14 are sections respectively on the lines A—A and B—B of Figs. 10 and 11, and Figs. 13 and 15 show sections modified from those of Figs. 12 and 14.

Figure 1:
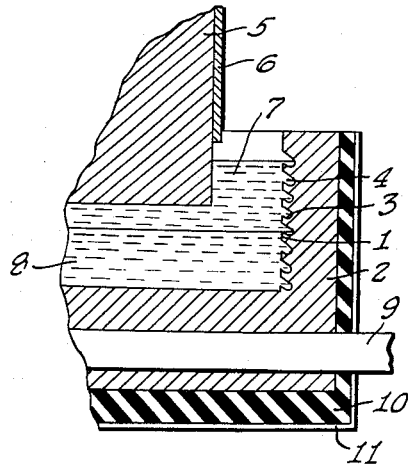
Fig. 1 shows in vertical section part of a typical conventional furnace with horizontal layers, modified according to the invention.

Fig. 1 of the drawings shows, in a conventional electrolytic furnace of the kind with Soederberg anodes, the surface 1 of the vertical wall 2, in contact with the bath. The wall 2 comprises the internal cathodic carbonaceous lining of the shell and is provided with grooves or pockets 3 according to the invention to collect deposits of aluminium 4. For the sake of completeness, in Fig. 1 there are also indicated a metal casing 6 of the anode 5, the fused salt bath 7, the liquid aluminium 8 collected on the bottom, the cathode current supply bar 9, and the refractory and insulating layer 10 of the metallic box or shell 11.

In the other figures, parts equivalent or corresponding to those above-mentioned have like reference numerals.

Figures 2, 5:
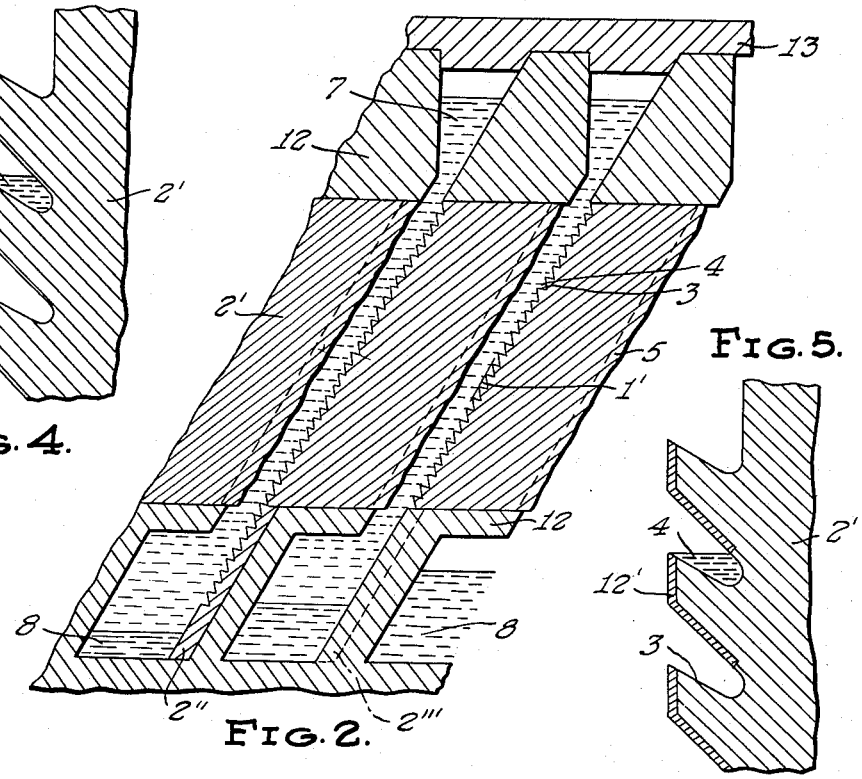
Fig. 2 shows in vertical section part of a multicell furnace of the kind with inclined stationary electrodes, modified according to the invention.

Fig. 2 shows a similarly modified sloping surface of a cathode carbon 2', in a multi-cell furnace with bipolar inclined stationary electrodes each having a restorable anodic face 5. The bipolar electrodes are located between parts 12 of a protective coating of inert and impermeable material, and surmounted by a removable refractory and insulating cover 13 for the cells. For simplicity, the drawing does not show the possible channels of communication between one cell and another, the covering tile structure, or other features of a furnace as described in applicant's above-mentioned application Serial No. 587,985. The carbon cathodes 2' may be submerged into the molten aluminium 8 collecting in the lower receivers or chambers, either over their whole width 2" or with a tail portion 2''' only. For clarity of illustration these two variants are represented, although they would not normally be employed in two contiguous cells of the same furnace.

Figure 3:
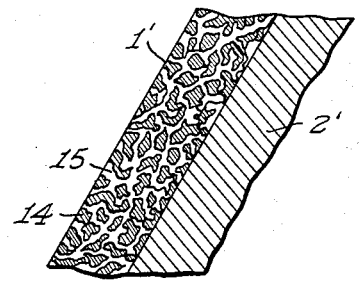
Fig. 3 shows in vertical section a detail of cathodic surface according to another embodiment of the invention.

Fig. 3 shows an embodiment of the invention in which the cathode surface 1' comprises a layer of porous or spongy carbon 14, in the pores 15 of which the aluminium 14 formed by electrolysis deposits until they are filled, so forming a mixed cathode of molten aluminium and carbon. The layer 14 may have, for instance, a thickness of about 1 to 4 cm.

Figure 4:
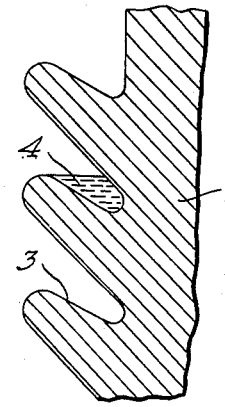
Figs. 4 to 9 show in vertical section details of cathodic surfaces according to various other embodiments of the invention.
Figures 6, 7:
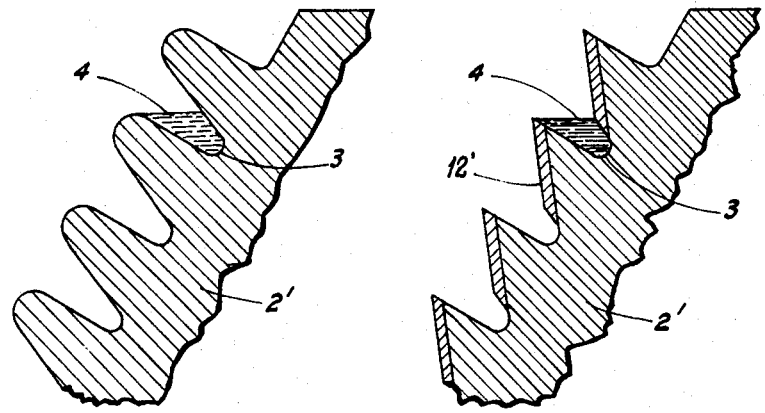
Figures 8, 9:
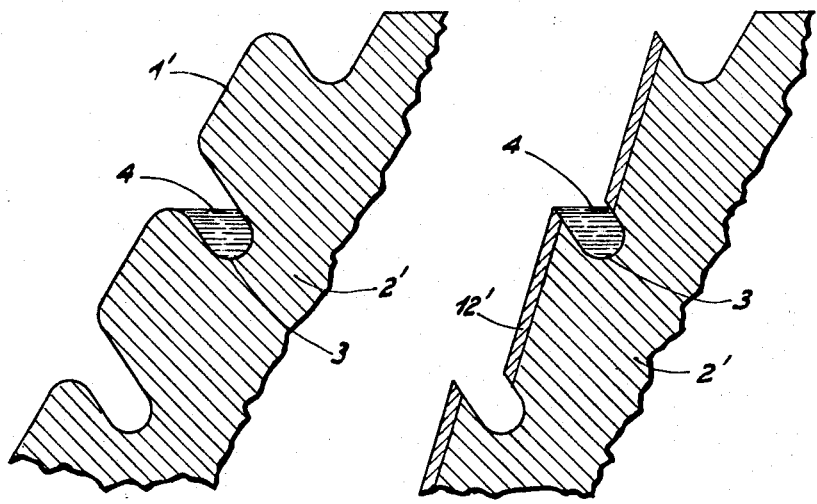

In Figs. 4, 6 and 8 there are represented in section different possible forms of horizontal channels for cathodic aluminium in cathodic surfaces as described with reference to Figs. 1 and 2. Figs. 5, 7 and 9 represent somewhat similar embodiments of such channels with the variant of a protective layer 12', which preferably consists of the same inert and impermeable material as the parts 12, shown in Fig. 2, and extends only over the portions of surface that are not in permanent contact with molten aluminium.

Figs. 10 and 11 show portions of cathode surfaces wherein the receptacles for cathodic aluminium according to the invention are constituted respectively by elongated recesses 3' and by round recesses 3''. Figs. 12 and 14 show respectively vertical sections A—A and B—B of these variants without protective coating, and Figs. 13 and 15 show modifications of these vertical sections with protective coatings 12'.

Although a number of embodiments of the invention have been shown and described, it will be apparent to those skilled in the art that various modifications may be made therein without departing from the spirit of the invention or the scope of the appended claims.

I claim:

1. A furnace for producing aluminium by electrolysis of alumina in a fused salt bath, the electrodes of which comprise an anode element, a bipolar electrode providing on its opposite sides cathodic and anodic surfaces, and a cathode element, the cathode walls of the electrodes being inclined and facing upwardly, respective pairs of opposed cathodic and anodic surfaces defining electrolysis gaps therebetween, a lower chamber adapted to receive the aluminium produced, the anodic surfaces of the electrodes being disposed at an angle to the horizontal and facing downwardly at their respective electrolysis gaps and being formed of carbonaceous material consumed in the electrolysis of the alumina, the cathode walls of the electrodes having cavities distributed over their height serving as receptacles retaining molten aluminium, the aluminium so retained serving as active cathodic centers.

2. A furnace for producing aluminium by electrolysis of alumina in a fused salt bath, the electrodes of which comprise an anode element, a bipolar electrode providing on its opposite sides cathodic and anodic surfaces, and a cathode element, the cathode walls of the electrodes comprising carbon and being inclined and facing upwardly, the aluminium produced flowing downwardly adjacent the cathode walls, the anodic surfaces of the electrodes being disposed at an angle to the horizontal and facing downwardly in contact with the salt bath and being formed of carbonaceous material consumed in the electrolysis of the alumina, the carbon cathode walls of the electrodes having cavities distributed over their height serving as receptacles retaining molten aluminium, the aluminium so retained serving as active cathodic centers, the surface areas of the aluminium collected in the receptacles being at least about thirty percent of the anodic surface of the anode opposite thereto across the intervening fused salt bath.

3. A furnace for producing aluminium by electrolysis of alumina in a fused salt bath, the electrodes of which comprise an anode element, a bipolar electrode providing on its opposite sides cathodic and anodic surfaces, and a cathode element, the cathode walls of the electrodes being inclined and facing upwardly, the aluminium produced flowing downwardly adjacent the cathode walls, the anodic surfaces of the electrodes being disposed at an angle to the horizontal and facing downwardly in contact with the salt bath and being formed of carbonaceous material consumed in the electrolysis of the alumina, the cathode walls of the electrodes having cavities distributed over their height serving as receptacles retaining molten aluminium, the aluminium so retained serving to protect the cathode and as active cathodic centers, the cathode wall surface having a protective layer of electric current insulating material on areas surrounding the outside of the receptacles.

4. A furnace for producing aluminium by electrolysis of alumina in a fused salt bath, the electrodes of which comprise an anode element, and a carbon cathode element, the cathode wall of the latter being inclined and facing upwardly, the aluminium produced flowing downwardly adjacent the cathode wall, a lower chamber to receive the aluminium below the salt bath, the anodic surface of the anode being disposed at an angle to the horizontal and facing downwardly in contact with the salt bath and being formed of carbonaceous material consumed in the electrolysis of the alumina, the cathode walls of the electrodes having cavities in the carbon distributed over their height serving as receptacles retaining molten aluminium, the aluminium so retained serving as active cathodic centers, the surface areas of the aluminium collected in the receptacles being at least about thirty percent of the anodic surface of the anode opposite thereto across the intervening fused salt bath.

5. The furnace defined in claim 2, the cathode walls comprising carbon, the lower end of a carbon cathode wall extending downwardly into the lower chamber so as to be submerged in molten aluminium collected in said chamber.

6. A furnace for producing aluminium by electrolysis of alumina in a fused salt bath, the electrodes of which comprise an anode element and a carbon cathode element, each element having a wall facing the fused bath and extending upwardly, the aluminium produced flowing downwardly adjacent the wall of the cathode to below the bath, the anodic surface of the anode being formed of carbonaceous material consumed in the electrolysis of the alumina, the wall of the carbon cathode having cavities distributed over substantially its entire surface serving as receptacles retaining molten aluminium, the aluminium so retained serving as active cathodic centers, the surface areas of the aluminium collected in the receptacles being at least about thirty percent of the anodic surface of the anode opposite thereto across the intervening fused salt bath, but less than that of said anodic surface.

7. In a method of producing aluminium by fused salt bath electrolysis in a furnace having an anode providing an anodic carbon surface consumable in the electrolysis and a carbon cathode having its cathode surface disposed at an angle with respect to a horizontal plane, the aluminium produced being heavier than the fused salt and flowing downwardly adjacent the cathode surface and being removed below, the improvement which comprises collecting and detaining molten aluminium produced in the process in stabilized active and protective centers distributed over substantially the entire carbon cathode surface, the detained molten aluminium being in contact both with the cathode carbon and the fused salt bath, the electrolytic current passing through the fused bath to said cathode surface, from a wall of a corresponding anode carbon and leaving the fused bath through said active centers of collected aluminium prior to entering the cathode carbon, the surface areas of the aluminium collected in the centers being less than that of the anodic surface opposed thereto.

8. In a method of producing aluminium by fused salt bath electrolysis in a furnace having an anode providing an anodic carbon surface consumable in the electrolysis, and a carbon cathode having its cathode surface disposed at an angle with respect to a horizontal plane, the aluminium produced being heavier than the fused salt and flowing downwardly adjacent the cathode surface and being removed below, the improvement which comprises collecting and detaining molten aluminium produced in the process in stabilized active and protective centers distributed over the carbon cathode surface, the detained molten aluminium being in contact both with the cathode carbon and the fused salt bath, the electrolytic current passing though the fused bath to said cathode surface, from a wall of a corresponding anode carbon and leaving the fused bath through said active centers of collected aluminium prior to entering the cathode carbon, the surface areas of the aluminium collected in the centers being at least about thirty percent of the anodic surface opposed thereto, but less than the latter.

9. In a method of producing aluminium by fused salt electrolysis in a furnace having an anode providing an anodic carbon surface consumable in the electrolysis, and a carbon cathode having its cathode surface disposed at an angle with respect to a horizontal plane, the aluminium produced being heavier than the fused salt and flowing downwardly adjacent the cathode surface and being removed below, the improvement which comprises collecting and detaining molten aluminium produced in the process in stabilized active and protective centers distributed over the carbon cathode surface, the detained molten aluminium being in contact both with the cathode carbon and the fused salt bath, the electrolytic current passing through the fused bath to said cathode surface, from a wall of a corresponding anode carbon and leaving the fused bath through said active centers of collected aluminium prior to entering the cathode carbon, the surface areas of the aluminium collected in the centers being at least about thirty percent of the anodic surface opposed thereto but less than the latter, fused aluminium being introduced, prior to starting the electrolysis, so as to initially constitute said stabilized active and protective centers formed of aluminium, powdery alumina to be electrolyzed being fed remotely from the cathode surface to minimize entry of the alumina into said centers.

10. In a method of producing aluminium by fused salt bath electrolysis in a furnace having an anode providing an anodic carbon surface consumable in the electrolysis, and a carbon cathode having its cathode surface disposed at an angle with respect to a horizontal plane, the aluminium produced being heavier than the fused salt and flowing downwardly adjacent the cathode surface and being removed below, the improvement which comprises collecting and detaining molten aluminium produced in the process in stabilized active and protective centers distributed over the carbon cathode surface, the detained molten aluminium being in contact both with the cathode carbon and the fused salt bath, the electrolytic current passing through the fused bath to said cathode surface, from a wall of a corresponding anode and leaving the fused bath through said active centers of collected aluminium prior to entering the cathode carbon, the surface areas of the aluminium collected in the centers being less than that of the anodic surface opposed thereto, fused aluminium being introduced, prior to starting the electrolysis, so as to initially constitute said stabilized active and protective centers formed of aluminium, powdery alumina to be electrolyzed being fed remotely from the cathode surface to minimize entry of the alumina into said centers.

11. A furnace for the production of aluminium by fused salt electrolysis comprising an electrolysis cell having an inclined carbon cathode wall, the inclined carbon cathode wall facing upwardly, an anode having an inclined electrochemically consumable carbon anode surface facing downwardly substantially in parallelism with the cathode wall, the cathode being adapted so that the aluminium produced by the electrolysis can flow downwardly along the inclined cathode, the furnace providing a lower chamber adapted for collection of the aluminium produced, the surface of said carbon cathode wall being formed with cavities distributed over substantially its entire cathodic area and adapted to serve as receptacles for retaining molten aluminium, whereby stabilized active and protective centers are provided at the surface of said cathode wall, the horizontal surface areas of the aluminium collected in the receptacles being at least about 30% of the anodic surface opposed thereto, but less than that of the latter.

12. The furnace defined in claim 11, the surface of said carbon cathode wall being covered with a layer of porous carbon the pores of which are adapted to be filled with and retain molten aluminium, said pores comprising said cavities.

13. The furnace defined in claim 11, the cavities comprising uniformly distributed horizontally elongated troughs, providing horizontal cathodic surfaces of aluminium distributed over the carbon cathode wall.

14. A furnace for the production of aluminium by fused salt electrolysis comprising an electrolysis cell having an inclined carbon cathode wall, the inclined carbon cathode wall facing upwardly, an anode having an inclined electrochemically consumable carbon anode surface facing downwardly, the aluminium produced by the electrolysis flowing downwardly along the inclined cathode, the furnace providing a lower chamber for collection of the aluminium below the surface of the fused salt, the surface of said carbon cathode wall being formed with cavities distributed over substantially its entire cathodic area and adapted to serve as receptacles for retaining molten aluminium, whereby stabilized active and protective centers are provided at the surface of said cathode wall, the horizontal surface areas of the aluminium collected in the receptacles being less than that of the anodic surface opposed thereto, the wall surface of the carbon cathode about said cavities being coated with a protective layer of inert, current-insulating material, whereby electrolysis will take place substantially exclusively on the horizontal surfaces of molten aluminium contacting the carbon cathode and retained in said cavities.

15. The apparatus defined in claim 14, said insulating material being electrofused magnesium oxide.

16. The apparatus defined in claim 14, said insulating material being electrofused aluminium oxide.

17. A furnace for the production of aluminium by fused salt electrolysis comprising an electrolysis cell having an inclined carbon cathode wall, the inclined carbon cathode wall facing upwardly, an anode having an inclined electrochemically consumable carbon anode surface facing downwardly, the aluminium produced by the electrolysis flowing downwardly along the inclined cathode, the furnace providing a lower chamber for collection of the aluminium below the surface of the fused salt, the surface of said carbon cathode wall being formed with cavities distributed over substantially its entire cathodic area and adapted to serve as receptacles for retaining molten aluminium, whereby stabilized active and protective centers are provided at the surface of said cathode wall, the wall surface of the carbon cathode about said cavities being coated with a protective layer of inert, current-insulating material, whereby electrolysis will take place substantially exclusively on the horizontal surfaces of molten aluminium contacting the carbon cathode and retained in said cavities.

18. A furnace for the production of aluminium by fused salt electrolysis comprising a plurality of electrolysis cells, each having an inclined carbon cathode wall, the inclined carbon cathode wall facing upwardly, and each having an anode having an inclined electrochemically consumable carbon anode surface facing downwardly, the cathodes being adapted so that the aluminium produced by the electrolysis can flow downwardly along the inclined cathodes, the furnace providing a lower receiver for collection of the aluminium produced, the surface of said carbon cathode wall being formed with cavities distributed over substantially its entire cathodic area and adapted to serve as receptacles for retaining molten aluminium, whereby stabilized active and protective centers are provided at the surface of said cathode wall, the horizontal surface areas of the aluminium collected in the receptacles being less than that of the anodic surface opposed thereto, the receiver providing individual electrically insulating aluminium collecting chambers at the lower ends of each of said electrolysis cells, the lower ends of said carbon cathode walls extending downwardly into the lower part of said respective collecting chambers.

19. A furnace for the production of aluminium by fused salt electrolysis comprising an electrolysis cell, said cell having horizontally disposed anode and carbon cathode surfaces, the horizontally disposed anode surface overlying the horizontally disposed cathode surface, the lower part of the furnace being adapted to receive the molten aluminium produced in the electrolysis, said cell also having upwardly-downwardly extending cathode surfaces, at least one of said upwardly-downwardly extending cathode surfaces being formed with grooves so disposed and shaped as to be operative to contain and retain bodies of molten aluminium to provide horizontally disposed cathodic surfaces of said molten aluminium, the areas of the latter molten aluminium horizontal surfaces being at least about thirty percent of the anodic surfaces opposite thereto, but less than that of the latter, the anodic surface being formed of carbon consumable in the electrolysis.

References Cited in the file of this patent

UNITED STATES PATENTS

| | | | |
|---|---|---|---|
| 544,153 | Borchers | | Aug. 6, 1895 |
| 1,569,606 | Ashcroft | | Jan. 12, 1926 |

FOREIGN PATENTS

| | | | |
|---|---|---|---|
| 162,951 | Australia | | May 20, 1955 |
| 4,917 | Austria | | Aug. 10, 1901 |
| 182,530 | Austria | | July 11, 1955 |
| 65,580 | Switzerland | | Mar. 29, 1913 |
| 29,438 | Norway | | Feb. 10, 1919 |